United States Patent
Petschnigg et al.

(10) Patent No.: US 8,330,733 B2
(45) Date of Patent: Dec. 11, 2012

(54) BI-MODAL MULTISCREEN INTERACTIVITY

(75) Inventors: Georg Petschnigg, Seattle, WA (US); Jonathan Reed Harris, Redmond, WA (US); Joshua J. Hinds, Duvall, WA (US); Sabrina Boler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 12/356,959

(22) Filed: Jan. 21, 2009

(65) Prior Publication Data

US 2010/0182247 A1 Jul. 22, 2010

(51) Int. Cl.
*G06F 3/041* (2006.01)

(52) U.S. Cl. ......... 345/173; 345/174; 345/179; 715/781

(58) Field of Classification Search ............... None
See application file for complete search history.

(56) References Cited

U.S. PATENT DOCUMENTS

| | | | |
|---|---|---|---|
| 4,939,507 A * | 7/1990 | Beard et al. | 345/156 |
| 5,149,211 A * | 9/1992 | Pettigrew et al. | 400/88 |
| 5,153,577 A * | 10/1992 | Mackey et al. | 345/639 |
| 8,102,381 B2 * | 1/2012 | Kimura | 345/173 |
| 2005/0093868 A1 | 5/2005 | Hinckley | |
| 2007/0152984 A1 | 7/2007 | Ording et al. | |
| 2007/0220444 A1 | 9/2007 | Sunday et al. | |
| 2008/0158189 A1 | 7/2008 | Kim | |
| 2008/0165141 A1 | 7/2008 | Christie | |
| 2008/0168368 A1 | 7/2008 | Louch et al. | |
| 2008/0216001 A1 | 9/2008 | Ording et al. | |
| 2009/0160732 A1 * | 6/2009 | Kimura | 345/1.1 |

FOREIGN PATENT DOCUMENTS

KR 1020070106888 A 11/2007

OTHER PUBLICATIONS

"International Search Report", Mailed Date: Aug. 13, 2010, Application No. PCT/US2009/069328, Filed Date: Dec. 22, 2009, pp. 9.
"Haptics: Improving the Mobile User Experience through Touch", Retrieved at<<http://static.fiercemarkets.com/public/ads/immersion/haptics_improving-mobile-ue-through-touch.pdf>>, pp. 12.
Loviscach Jorn,"Two-Finger Input with a Standard Touch Screen", Retrieved at<<http://delivery.acm.org/10.1145/1300000/1294239/p169-loviscach.pdf?key1=1294239&key2=6360046221&coll=GUIDE&dl=GUIDE&CFID=10353642&CFTOKEN=10125409>>, UIST'07, Oct. 7-10, 2007, Newport, Rhode Island, USA, ACM, pp. 169-172.

(Continued)

*Primary Examiner* — Van Chow
(74) *Attorney, Agent, or Firm* — Alleman Hall McCoy Russell & Tuttle LLP

(57) ABSTRACT

A touch-sensitive electronic display device including one or more touch-sensitive display screens and interface software. The touch-sensitive display screen(s) and interface software are configured to be responsive to touch inputs and, in the case of a multi-screen workspace, the interface software is operable to allow inputs made in connection with a first screen to generate an inertial movement of a displayed object which results in the object moving to and coming to rest on another of the screens. The touch-sensitive screen and interface software may also be configured to receive hand touch inputs and pen touch inputs, with the interface software being operable to dynamically mask regions of the touch-sensitive display to discriminate between or selectively permit/reject different types of inputs.

19 Claims, 3 Drawing Sheets

OTHER PUBLICATIONS

Hafeneger, et al. "PocketTable: Mobile Devices as Multi-Touch Controllers for Tabletop Application Development", Retrieved at<<http://hci.rwth-aachen.de/tiki-download_wiki_attachment.php?attId=631>>, pp. 2.

"LucidTouch—A See-through 2-Sided Touch Mobile Device", Retrieved at<<http://www.merl.com/projects/lucidtouch/>>, Nov. 12, 2008, pp. 2.

* cited by examiner

BI-MODAL MULTISCREEN INTERACTIVITY

BACKGROUND

The present disclosure relates to touch-sensitive displays. Touch-sensitive displays are increasingly used in a variety of applications. Touch inputs are received and processed in various ways. Input mechanisms exist for responding to touches from a user's hand, from a touchscreen pen or like implement, etc.

Creating natural and intuitive use scenarios for touch inputs has been an ongoing design challenge. Existing devices are often limited and inflexible in the ways that they receive touch inputs. In many devices, only one type of touch input is permitted, thereby limiting functionality. In other cases, the utility of the interface is compromised due to poor discrimination between intentional and inadvertent touches, or because the device requires the user to interact with it in an unnatural or counterintuitive manner in order to properly interpret touch inputs. Other devices suffer from poor layout and/or sub-optimal device postures. In general, existing devices are limited in their leveraging of the wide range of advantages that are realizable through use of touch-sensitive displays.

SUMMARY

Accordingly, the present disclosure provides, in one aspect, a touch-sensitive electronic display device including one or more touch-sensitive display screens and interface software. The touch-sensitive display screen(s) and interface software are configured to receive touch inputs, which may include hand touch inputs and/or touch inputs from a pen or other marking device. In the case of a multi-screen workspace, the interface software is operable to allow inputs made in connection with a first screen to generate an inertial movement of a displayed object which results in the object moving to and coming to rest on another of the screens. Where different types of touch inputs are permitted (e.g., hand touch inputs and pen touch inputs), the interface software may be configured to dynamically mask regions of the touch-sensitive display to discriminate between or selectively permit/reject different types of inputs

DETAILED DESCRIPTION

Figure 1:
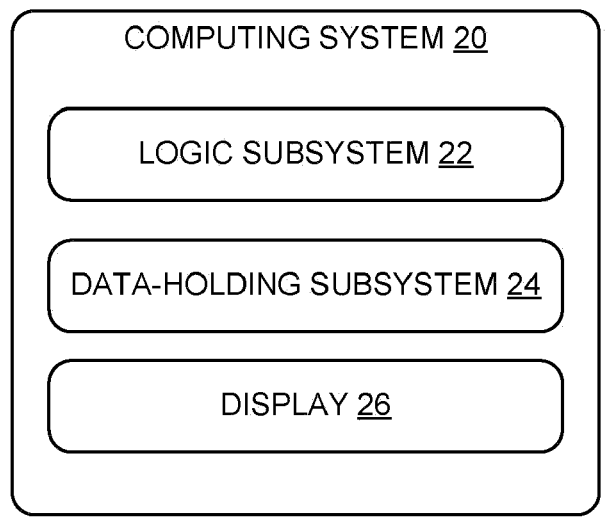
FIG. 1 is an exemplary computing system that may be used in connection with the display systems and methods of the present disclosure.

The present description provides for an input and output system and method for an electronic display, which in many examples is implemented as a touch-sensitive display. The system and method is typically implemented in connection with a computing system 20, as shown in FIG. 1. Computing system 20 may include a logic subsystem 22 and data-holding subsystem 24 (e.g., memory and/or storage) operatively coupled with a display 26. In many of the settings described herein, display 26 will be a touch-sensitive display, although it will be appreciated that some of the examples described herein are applicable to other types of displays.

Data-holding subsystem 24 typically holds a user interface program or other instructions that are executable by logic subsystem 22 to provide user interactivity and other input and output functionality for the display.

The display and underlying interface software are configured to provide a contiguous virtual workspace. The workspace is similar to what is often referred to as a "desktop" in personal computing environments.

Figure 2:
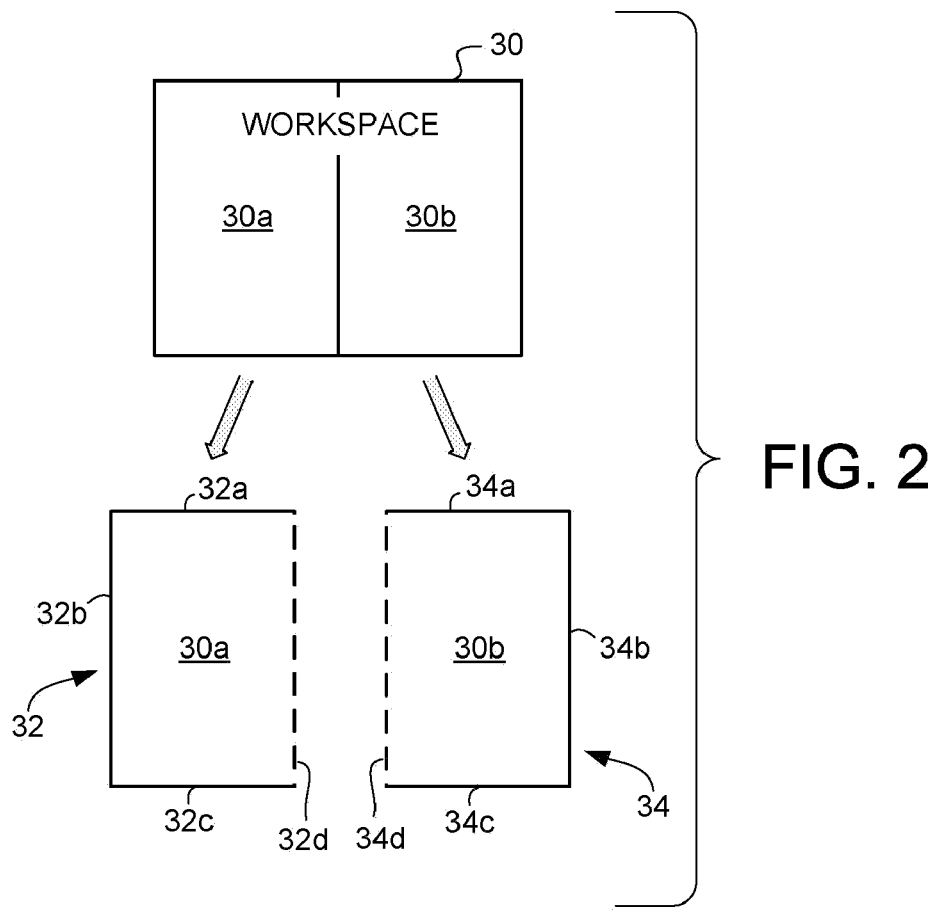
FIG. 2 is a schematic depiction of a contiguous virtual workspace according to the present disclosure, including an illustration of the spanning of the work space across multiple screens.

At times it will be desirable to graphically represent the workspace with multiple screens. For example, as shown in FIG. 2, workspace 30 may be divided into halves 30a and 30b, with each half being displayed on a separate screen (i.e., screens 32 and 34).

When the workspace spans multiple screens, as in the present example, each screen may include hard edges or edge portions and soft edges or edge portions. For example, sides 32a, 32b and 32c (and 34a, 34b and 34c) are hard edge portions because they define the edge boundaries of workspace 30. On the other hand, screen edges 32d and 34d are soft edges, because the represented workspace portions (i.e., workspace halves 30a and 30b) extend beyond these screen edges. More particularly, edges 32d and 34d correspond to one another, and define a contiguous/continuous transition between workspace half 30a and workspace half 30b. Specifically, if a single pixel object were moving in a rightward direction across screen 32, it would immediately appear at the leftmost edge of screen 34 (soft edge 34d) after disappearing off of the soft edge 32d of screen 32. In other words, in terms of the depiction of workspace 30, the rightmost column of pixels on screen 32 is immediately adjacent the leftmost column of pixels displayed on screen 34.

The multiple-screen workspace may be displayed in a variety of ways. For example, an electronic device may have a single display screen (or portion thereof) on which the workspace is partially represented. Referring back to exemplary workspace 30, only one half (30a or 30b) would be visible to the user at any given time, and various inputs could be used to cause the display to switch between the workspace halves. In another example, an electronic device would include multiple displays that could be used to display the entire workspace.

Figure 3:
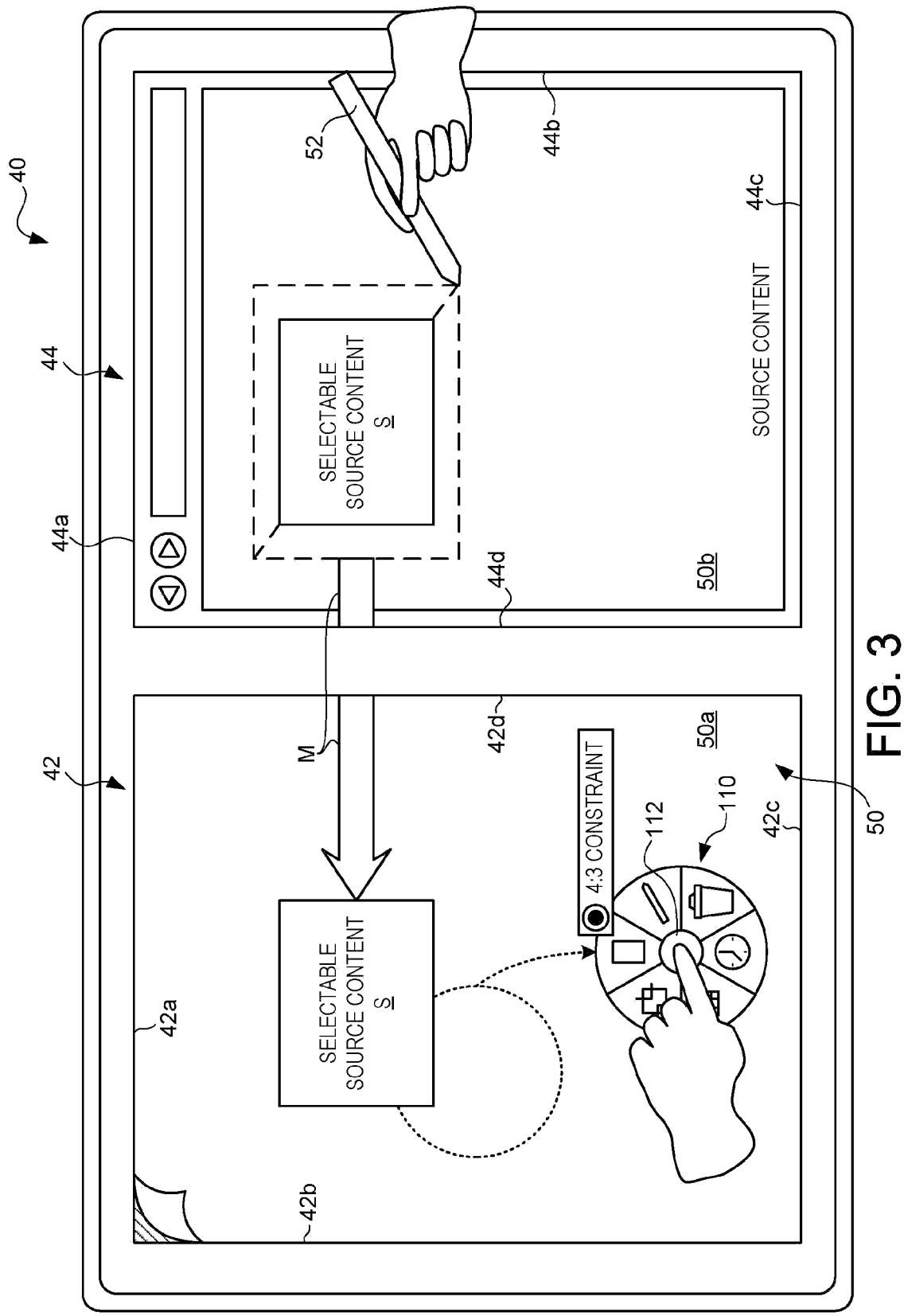
FIG. 3 is an electronic display device according to the present disclosure, showing examples of the display systems and methods described herein.

Referring particularly to FIG. 3, an example is shown of an electronic device 40 having multiple display screens. The depicted example has two displays 42 and 44, though it will be appreciated that three or more displays are also contemplated by the present discussion. In one exemplary configuration, the device is provided in a form factor in which the two screens are foldable via a hinge into a closed configuration, similar to a notebook. Indeed, in certain embodiments and use scenarios, the display systems and methods described herein may be employed to uniquely combine the advantages of paper-based tools such as notebooks with those obtainable through digital display technology. Furthermore, the examples described herein may be configured for use in connection with a variety of different device postures, including portrait, landscape, reading, storyboard, side-by-side, journal configurations, etc.

Continuing with FIG. 3, and similar to the previous discussion, a contiguous virtual workspace 50 spans the two displays/screens, with portions 50*a* and 50*b* (screenfuls of workspace) respectively displayed on displays 42 and 44. As before, each screen includes hard edges 42*a*, 42*b* and 42*c*, and 44*a*, 44*b* and 44*c*, which correspond to the edge boundaries of workspace 50. Soft edges 42*d* and 44*d* correspond to one another and define a continuity of the workspace 50 across/spanning the two screens.

In many cases, it will be desirable for the system to display graphical objects or other material entirely on one screen or on the other. For example, for objects that are relatively small in comparison to the screens or workspace, it will often be desirable to avoid splitting the material across the two screens. For example, referring to display screen 44, a user is shown as having selected a relatively small region of content (selectable content S) in a 4:3 aspect ratio (e.g., a cropped photograph selected by hand manipulation of a touchscreen pen device 52). Furthermore, the example shows the selected content being moved from a first position on screen 44 to a new location on screen 42. In both the original and relocated position, the material is displayed in its entirety on one screen, for purposes of readability, ease of editing, etc.

Figure 4:
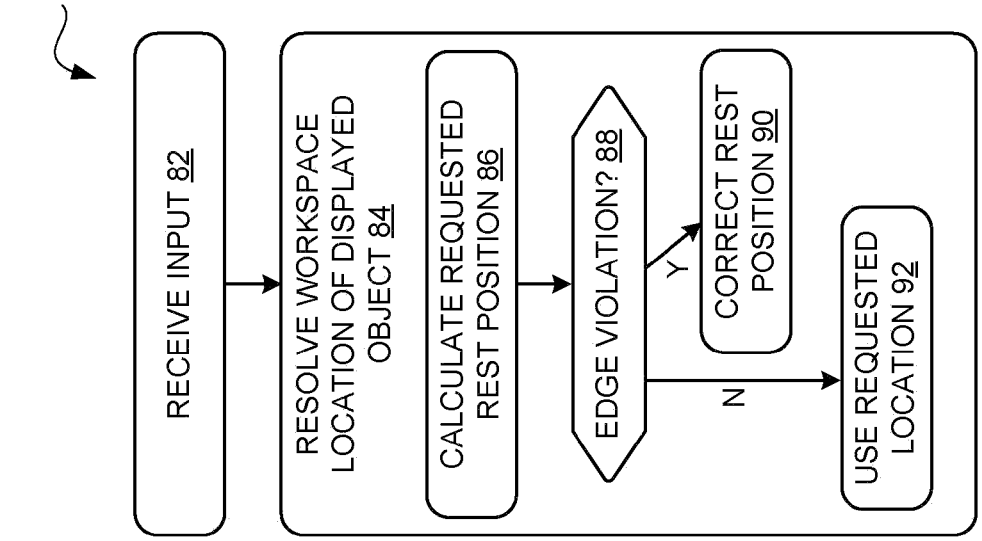
FIG. 4 is a flowchart depiction of an exemplary method for controlling display of a movable object, particularly in the exemplary context of inertial movements on single and multi-screen displays.

The interface software described herein may be especially configured with functionality to facilitate appropriate display of material entirely on one screen of the multi-screen workspace. Typically, the interface software and related method operate in response to a user input that calls for or requests that a graphical object be moved to or displayed in a particular location on the virtual workspace 50. The input is indicated at 82 on FIG. 4, which shows an exemplary method 80 for controlling input and display of material in a multi-screen workspace setting.

Continuing with exemplary method 80, the method includes, at 84, resolving a location for a displayed object so that it is wholly displayed on one screen or the other, and is not split across the screens. In one example, the method is performed in connection with a user input that causes an inertial movement of a displayed object across the workspace (e.g., workspace 50). The user input may be a touch input made on or in relation to one of the screens which imparts a velocity to the displayed object. In such a case, dependent upon the velocity imparted to the displayed object, the object may come to rest in a location on the other screen of the workspace (e.g., the inertial motion M in FIG. 3 causes selectable source content S, which is originally displayed on display 44, to cross soft edges 44*d* and 42*d* and come to rest on the portion of workspace 50 which is shown on display 42). In other words, according to this example, if the inertial movement is of sufficient velocity (i.e., high enough speed and in an appropriate direction), the interface is configured to cause the inertial movement to cause the displayed object to travel fully between the first screen and the second screen.

Referring back to FIG. 4 and specifically to the resolution step 84, the general method may include calculating a requested resting position for the displayed object, as shown at 86. The requested position may be based upon the user input. For example, in the case of inertial motion, the request results in the displayed object moving in a particular direction with a particular speed. For example, touch displays often allow a user to move a displayed object with a swiping gesture, in which the user drags the object and releases it while it is still moving, so as to impart a simulated inertial movement of the object along the virtual workspace. Friction is simulated, so that the object eventually comes to rest in a new location.

In the present example, it is possible that a commanded inertial motion would cause an object, if unconstrained, to travel beyond a hard edge of one of screens 42 and 44. Such a request would violate the workspace definition (i.e., it would result in the object moving off of the workspace). Accordingly, the interface software can provide a corrected result, in which the object comes to rest against the hard edge. The violation determination and correction are shown at 88 and 90, respectively. If no correction is called for, the object is displayed in the requested location, as shown at 92.

In another scenario, the input may result in generating an inertial motion of the displayed object toward a soft edge of one of the screens, as is the case with the motion M of the selectable source content shown in FIG. 3. In this case, calculating the requested resting position could conceivably result in: (1) the object falling short of the soft edge, and thus remaining wholly on the first screen; (2) the object coming to rest so as to be partially displayed or split across the two screens, also referred to as a "partial display condition"; or (3) the object having sufficient speed to completely cross the soft edges and come to rest wholly displayed on the other of the two screens.

Regarding eventuality (2) above, the interface software may be configured to deem this a violation of the workspace screen display rules (an edge violation or partial display condition). In particular, as described above, it may be desirable that relatively small objects not be split across the screens. Thus, for example, the workspace rules could be defined so that, for objects smaller than a predetermined threshold, eventuality (2) is an edge violation which requires a corrected resting place for the object.

The system and method may be configured in various ways to correct for and avoid a partial display condition or other impermissible edge conditions. For example, remediation may be dependent upon whether the prohibited condition involves a hard edge or a soft edge. Since a hard edge issue typically involves an inertial motion which would cause the moving object to travel off of the workspace, the correction typically involves positioning the object at or near the location where the object would have left the workspace. One alternative is to simply position the object in contact with the hard edge at the point of departure. Alternatively, an inertial bumper interaction may be displayed, in which the object appears to bump off the hard edge, with the resulting resting location being at the point of contact with the hard edge or slightly spaced away from the point of contact (e.g., similar to the interaction of a billiard ball with an edge cushion of a billiard table).

In the case of a soft edge, the remediation may be dependent upon various factors such as the velocity and/or initially-calculated rest position of the object. To avoid a partial display condition, one or more of the following may be employed in connection with an inertial movement of a graphical object in the virtual workspace: (1) immediately after the object comes to rest in a prohibited condition in which it overlays soft screen edges, the interface software causes the object to be nudged and repositioned so as to be fully displayed on one of the screens immediately adjacent the relevant soft edges; (2) an inertial motion parameter such as the object's speed can be increased or decreased immediately upon calculating that an unmodified speed would produce a partial display condition; and/or (3) an inertial motion parameter such as the surface friction or damping of the virtual workspace may be increased or decreased upon determining that an unmodified friction would produce a partial display condition. An inertial bumper interaction can also be employed at a soft edge if the inertial motion is of insufficient velocity to cause the object to fully travel between the screens. For example, if the speed were too low to carry an object across a soft edge transition in the virtual workspace, the soft edge could act as a bumper to retain the object on the first screen.

As described elsewhere herein, some implementations will involve a relatively large format touch-sensitive display (or multiple displays) capable of receiving both pen touch inputs (e.g., from a touchscreen pen or like implement) and touch inputs from a user's hand, typically the fingers. In this and other settings, it may be desirable to provide an ability to distinguish between simultaneous inputs, and/or reject touch contact that is inadvertent and does not correspond to a desired commanding of the system.

Accordingly, the present system and method may also provide for controlling a touch-sensitive display to selectively and dynamically control responsiveness of different regions of a touch display. In many examples, the masking is used to discriminate between and select for a type of touch input. For example, hand touch inputs may be permitted while pen touch inputs are blocked, or vice versa.

In a first example, rejection of all touch inputs, or of a certain type of touch input, is effected in a dynamically selected region of the display. Furthermore, the specific masked region may vary according to circumstance or in response to other inputs or parameters. One alternative is to perform masking based on an expected user behavior. For example, if an application is configured to receive a pen input from a touchscreen pen in a particular location at a particular time, adjacent areas can be masked to prevent inadvertent commanding of the system based on the user's palm or other parts of the hand holding the touchscreen pen.

Alternatively, instead of being based on anticipated behavior, masking may be based on real-time detection of pen behavior or other conditions. For example, the interface may be configured to assume a touch input having diameter or dimensions smaller than a threshold is a pen input, and then mask accordingly in adjacent areas to prevent palm rest or other undesired interpretation of input. Furthermore, the masked region may be determined based upon a handedness (i.e., right or left-handed) of the user, so as to not unnecessarily disable portions of the display where an intentional touch input may occur (e.g., with the user's other hand).

Figure 5:
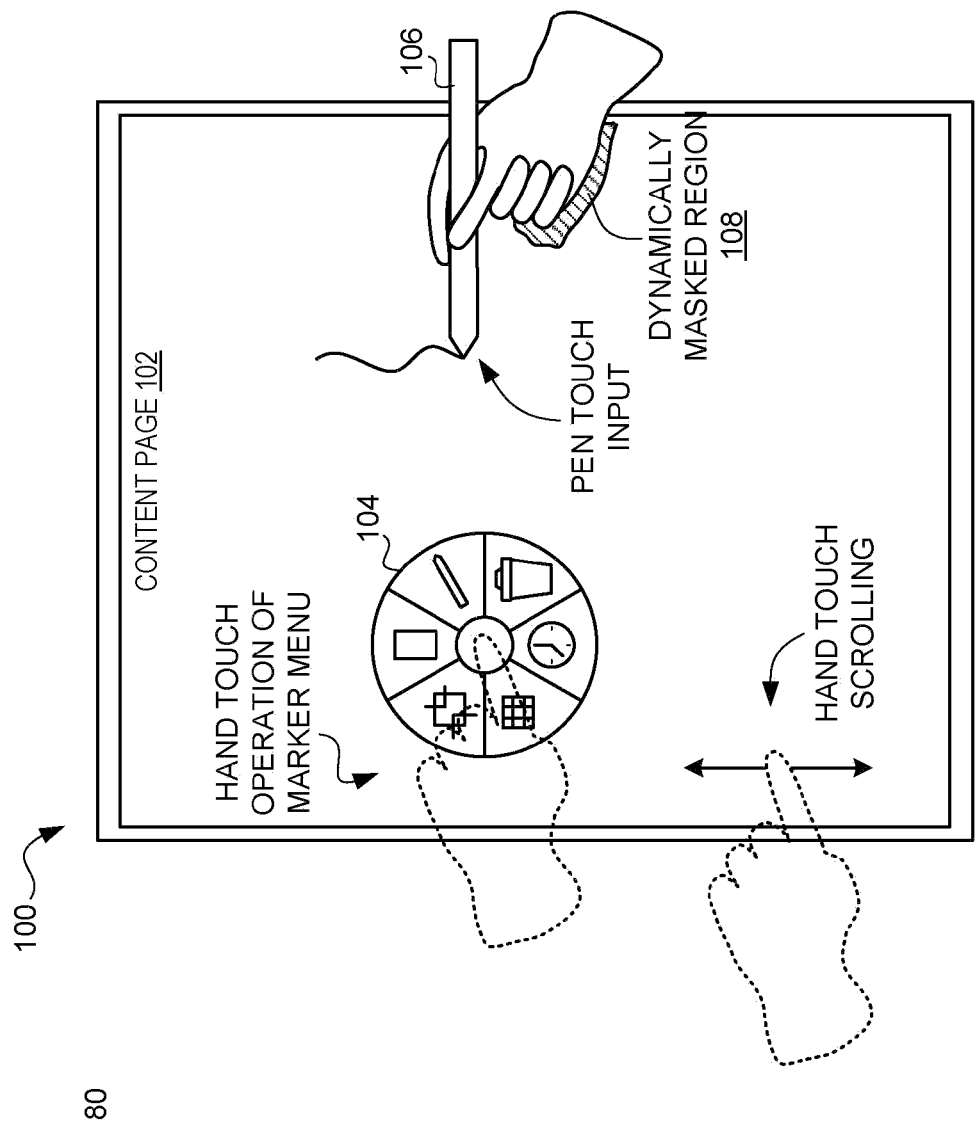
FIG. 5 depicts another example of a touch-sensitive display, showing examples of bi-modal pen-touch and hand-touch operation, and dynamic region masking.

FIG. 5 further illustrates and explains the dynamic masking capability. In particular, touch-sensitive display screen 100 is generally capable of receiving both hand touch and pen touch inputs over its entire surface. For example, as shown in the lower left portion of the screen, a user's hand may be used to provide touch inputs to drag and control scrolling of a page of content 102. Hand touch inputs may also be used to position and selectively activate marker menu 104. These are but examples; hand touch inputs may be used to provide other functionality.

In addition, as indicated, touch-sensitive display is configured to receive touch inputs from a touchscreen pen or like implement 106. In the depicted example, touchscreen pen 106 is manipulated by the user's right hand to draw a freeform line. Various other functions may be performed via receipt of pen touch inputs, including straight-line drawing, cropping, selection, etc. In one class of examples, marker menu 104 is configured to enable a user to select from various tools or functionality associated with pen inputs. For example, one selection would cause pen inputs to command the drawing of straight lines, while another selection might cause pen inputs to command a crop selection function. Marker menu 104 may be a touch-select radial pie menu, which is responsive to radial touch gestures to select the type of marking operation to be performed.

Dynamic masking may proceed dynamically according to various logic and/or use scenarios. In one example, the entire screen may be disabled to hand touch inputs (i.e., only pen inputs permitted), except in relation to marking menu 104. In another scenario, hand touch inputs and pen touch inputs would be permitted, but hand touch inputs would be rejected except for in a particular region of the screen (e.g., a scroll bar to one side of the screen).

In another class of examples, both pen touch and hand touch inputs would be generally permitted, but constraints would be applied dynamically during application of pen inputs. One alternative is to mask the entire display upon detection of a pen touch input. Such detection could be triggered by or conditioned upon a touch input having a diameter or other dimension smaller than a threshold, thereby supporting the assumption that the input corresponds to the pen implement, as opposed to the normally larger contact area resulting from a hand touch. Such a masking may be desirable, for example, to disable scrolling while pen touch input is being received, such as during the drawing of a line.

Continuing with the above example, upon detection of a pen input, masking may instead by dynamically performed in a region 108 near the area of the pen input, so as to reject palm rest or other contact of parts of the hand holding the pen implement. The masked region may be selected based on a known handedness of the user, and/or upon predicted regions of hand rest, as determined in advance based upon average hand sizes or other information. In addition to or instead of the above masking, detection of pen touch inputs may cause disabling of all hand touch input expect for hand touch inputs used to control marker menu 104. Additional marker menu functionality will now be described with reference back to FIG. 3.

Referring again to FIG. 3, the systems and methods described herein may provide for improved functionality in connection with a marker menu 110. The figure also illustrates particular advantages that may be obtained through an interface that is responsive to both hand touch and pen touch inputs. Initially, it will be noted that the marker menu 110 may be selectively positioned at a desired location on the touch-sensitive display. In particular, the present example shows relocation of marker menu 110 in response to a dragging/wiping hand touch gesture, so as to make room for the selected content S that is shown as being moved along virtual workspace 50 from screen 44 to screen 42.

In addition to being movable through hand touch inputs or other inputs, marker menu 110 may be actuated to cause selective variation of the function of the selected tool. In one implementation, this modifying actuation is performed by touching the central "soft button" 112 of marker menu 110. For example, if a straight line tool is selected via a radial gesture to marker menu 110, the soft button could potentially be used to constrain the straight line to snap to one of a plurality of preset angles, such as 0, ±45 or ±90 degrees. In another example, the soft button could be used to vary the width of the marked line. In still another example (depicted in FIG. 3), the soft button could be used to force the cropping tool to maintain a desired aspect ratio when selecting rectangular regions for cropping.

Furthermore, it should be appreciated that touch-operable tools other than the described marker menu may be employed to provide further functionality to the described systems and methods. In many cases, and similar to one of the above examples with the marker menu, these additional touch operable tools may be used to vary operation of a touchscreen pen device. For example, one such tool is a virtual ruler that may be position and otherwise manipulated via touch inputs from a user's hand. The virtual ruler may be used to facilitate straight line drawing and/or perform other operations.

It will be understood that the example methods disclosed herein may be used with various system configurations. These methods may represent one or more different processing strategies such as event-driven, interrupt-driven, multitasking, multi-threading, and the like. As such, the disclosed process steps (operations, functions, and/or acts) may represent code to be programmed into computer readable storage medium in a system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A multi-screen electronic workspace, comprising:
a contiguous virtual workspace which, when represented graphically, spans at least a first screen and a second screen, where each of the first screen and the second screen includes at least one soft edge portion and at least one hard edge portion, where a hard edge portion corresponds to an edge of the virtual workspace, and where a soft edge portion of one of the first screen and the second screen corresponds to a contiguous continuity of the virtual workspace from such soft edge portion to a corresponding soft edge portion of the other of the first screen and the second screen; and
interface software configured to provide user interactivity with the virtual workspace and control display of data on the first screen and the second screen, where the interface software is configured to resolve, following and in response to a movement of a displayed object produced by a user input applied to one of the first screen and the second screen, a resting location for the displayed object, the resting location being resolved by the interface software such that the displayed object is displayed in its entirety on the first screen or in its entirety on the second screen, and is not displayed partially on either of the first screen and the second screen.

2. The electronic workspace of claim 1, where the movement of the displayed object is an inertial movement produced by a touch input applied to one of the first screen and the second screen, and where if the inertial movement has sufficient velocity, the interface software is configured to cause the inertial movement to cause the displayed object to travel fully between the first screen and the second screen.

3. The electronic workspace of claim 2, where the interface software is configured to avoid a partial display condition of the displayed object by modifying a parameter of the inertial movement.

4. The electronic workspace of claim 3, where the interface software is configured to avoid the partial display condition by modifying a speed of the inertial movement.

5. The electronic workspace of claim 3, where the interface software is configured to avoid the partial display condition by modifying a friction arising from the inertial movement.

6. The electronic workspace of claim 2, where if the inertial movement has insufficient velocity to cause the displayed object to travel fully between the first screen and the second screen, the interface software is configured to cause display of an inertial bumper interaction between the displayed object and an edge portion of one of the first screen and the second screen.

7. The electronic workspace of claim 1, where at least one of the first screen and the second screen is configured to receive both hand touch inputs and pen touch inputs.

8. The electronic workspace of claim 1, where at least one of the first screen and the second screen is a touch-sensitive display screen, and where the interface software is further configured to:
receive and process pen touch inputs based upon contact of a touchscreen pen manipulated by a user with the touch-sensitive display screen;
receive and process hand touch inputs based upon contact of a hand of the user with the touch-sensitive screen; and
provide and display a touch-operable marker menu configured to enable user selection of a type of marking operation to be carried out in response to pen touch inputs produced by the touchscreen pen.

9. The electronic workspace of claim 1, where at least one of the first screen and the second screen is a touch-sensitive display screen, and where the interface software is further configured to:
receive and process pen touch inputs based upon contact of a touchscreen pen manipulated by a user with the touch-sensitive display screen;
receive and process hand touch inputs based upon contact of a hand of the user with the touch-sensitive screen; and
dynamically and selectively mask different regions of the touch-sensitive display screen such that a masked region is non-responsive to one of the pen touch inputs and the hand touch inputs while being responsive to the other of the pen touch inputs and the hand touch inputs.

10. A touch-sensitive input and display system, comprising a touch-sensitive display screen; and
a logic subsystem operatively coupled with the touch-sensitive display screen; and
a data-holding subsystem holding interface instructions executable by the logic subsystem to:
receive and process pen touch inputs based upon contact of a touchscreen pen manipulated by a user with the touch-sensitive display screen;
receive and process hand touch inputs based upon contact of a hand of the user with the touch-sensitive screen; and
dynamically and selectively mask different regions of the touch-sensitive display screen such that a masked region is non-responsive to one of the pen touch inputs and the hand touch inputs while being responsive to the other of the pen touch inputs and the hand touch inputs.

11. The system of claim 10, where the interface instructions are further executable by the logic subsystem to dynamically mask a selected region of the touch-sensitive display screen against hand touch inputs, and where such dynamic masking is performed in response to detection of pen touch inputs, and where the selected region is variable and dependent upon a detected location of the pen touch inputs.

12. The system of claim 10, where the interface instructions are further executable by the logic subsystem to dynamically mask all of the touch-sensitive display screen against hand touch inputs upon detection of pen touch inputs.

13. The system of claim 10, where the interface instructions are further executable by the logic subsystem to provide a marker menu which is displayed on the touch-sensitive display screen and which is responsive to hand touch inputs, and where upon detection of pen touch inputs on the touch-sensitive display screen, the interface instructions are further executable by the logic subsystem to permit hand touch operation of the marker menu while dynamically masking a remainder of the touch-sensitive display screen against hand touch inputs.

14. The system of claim 13, where the interface instructions are further configured to enable a user to reposition the marker menu on the touch-sensitive display via touch inputs applied to the marker menu from a hand of the user.

15. A touch-sensitive input and display system, comprising:
 a touch-sensitive display screen;
 a logic subsystem operatively coupled with the touch-sensitive display screen; and
 a data-holding subsystem holding instructions executable by the logic subsystem to:
  provide a marker menu which is displayed on the touch-sensitive display screen, the marker menu configured to enable selection of a selected marking operation to be carried out on the touch-sensitive display screen based upon user inputs, the marker menu including a touch-sensitive actuator operable to cause dynamic modification of the marking operation; and
  move the marker menu from a first location to a second location on the touch-sensitive display screen in response to touch inputs applied by a user to the touch-sensitive display screen.

16. The system of claim 15, where the marker menu is a radial touch-select menu.

17. The system of claim 15, where the touch-sensitive display screen is configured to be receptive to both pen touch inputs and hand touch inputs, and where the instructions are further executable by the logic subsystem to dynamically and selectively mask regions of the touch-sensitive display screen such that a selected region is permitted to receive one of, while being prohibited from receiving the other of, the pen touch inputs and the hand touch inputs.

18. The system of claim 17, where the instructions are further executable by the logic subsystem to dynamically mask a selected region of the touch-sensitive display screen against hand touch inputs, and where such dynamic masking is performed in response to detection of pen touch inputs, and where the selected region is variable and dependent upon a detected location of the pen touch inputs.

19. The system of claim 17, where upon detection of hand touch inputs on the tough-sensitive display screen, the instructions are further executable by the logic subsystem to permit hand touch operation of the marker menu while dynamically masking a remainder of the touch-sensitive display screen against hand touch inputs.

* * * * *